(12) United States Patent
Göbbel et al.

(10) Patent No.: US 7,223,876 B2
(45) Date of Patent: May 29, 2007

(54) METHOD OF SEPARATING AN OLEFIN FROM A GAS STREAM

(75) Inventors: Hans-Georg Göbbel, Kallstadt (DE); Henning Schultz, Mannheim (DE); Peter Schultz, Bad Dürkheim (DE); Renate Patrascu, Stade (DE); Malte Schulz, Hollern-Tw. (DE); Meinolf Weidenbach, Drochtersen (DE)

(73) Assignees: BASF Aktiengesellschaft, Ludwigshafen (DE); The Dow Chemical Company, Legal Department, Intellectual Property Section, Midland, MI (US)

( * ) Notice: Subject to any disclaimer, the term of this patent is extended or adjusted under 35 U.S.C. 154(b) by 234 days.

(21) Appl. No.: 10/828,291

(22) Filed: Apr. 21, 2004

(65) Prior Publication Data

US 2005/0240038 A1    Oct. 27, 2005

(51) Int. Cl.
*C07D 301/12* (2006.01)
(52) U.S. Cl. ...................................... 549/531; 549/523
(58) Field of Classification Search ................ 549/541, 549/542, 531, 523
See application file for complete search history.

(56) References Cited

U.S. PATENT DOCUMENTS

| | | | | |
|---|---|---|---|---|
| 2,353,234 A | * | 7/1944 | Hachmuth | ................... 585/330 |
| 3,312,719 A | | 4/1967 | Huellstrung et al. | |
| 5,468,885 A | * | 11/1995 | Jubin, Jr. | .................... 549/531 |
| 5,599,955 A | | 2/1997 | Vora et al. | |
| 6,380,119 B1 | | 4/2002 | Grosch et al. | |
| 6,479,680 B1 | | 11/2002 | Bassler et al. | |
| 6,667,409 B2 | * | 12/2003 | Shah et al. | ................. 549/532 |

FOREIGN PATENT DOCUMENTS

| | | |
|---|---|---|
| DE | 1 212 507 | 3/1966 |
| DE | 198 35 907 A1 | 2/2000 |
| EP | 0 311 983 A2 | 4/1989 |
| EP | 0 405 978 A1 | 1/1991 |
| EP | 0 583 828 | 2/1994 |
| EP | 0 719 768 | 7/1996 |
| WO | WO 98/55228 | 12/1998 |
| WO | WO 02/102496 | 12/2002 |
| WO | WO 2004/018088 A1 | 3/2004 |

OTHER PUBLICATIONS

"Ullmann's Encyclopedia of Industrial Chemistry", Editor: Barbara Elvers , et al., Fifth, Completely Revised Edition, vol. A 22: Poly (Vinyl Esters) to Reduction, pp. 214-216.

* cited by examiner

*Primary Examiner*—Bernard Dentz
(74) *Attorney, Agent, or Firm*—Oblon, Spivak, McClelland, Maier & Neustadt, P.C.

(57) ABSTRACT

The present invention relates to a method of separating an olefin from a gas stream, said gas stream comprising the olefin and at least one other component, said method comprising
(i) compressing and cooling the gas stream;
(ii) separating the olefin from the gas stream by absorbing the olefin in an absorbent;
(iii) separating the olefin from the absorbent by desorption;
wherein compressing or cooling or compressing and cooling in (i) is carried out at least twice.

44 Claims, 2 Drawing Sheets

METHOD OF SEPARATING AN OLEFIN FROM A GAS STREAM

FIELD OF THE INVENTION

The present invention relates to a method of separating an olefin from a gas stream, said gas stream comprising the olefin and at least one other component, said method comprising (i) compressing and cooling the gas stream;
(ii) separating the olefin from the gas stream by absorbing the olefin in an absorbent;
(iii) separating the olefin from the absorbent by desorption;

wherein compressing or cooling or compressing and cooling in (i) is carried out at least twice, preferably three times. According to a preferred embodiment of the present invention, the olefin is propene. According to another preferred embodiment, the gas stream is an offgas stream from an epoxidation process in which an olefin, preferably propene is reacted with at least one hydrogen peroxide to give the olefin oxide, preferably the propene oxide. Therefore, according to a still further preferred embodiment, the separation process described above is part of a process, preferably a highly integrated process of producing an olefin oxide.

BACKGROUND OF THE INVENTION

It is known that in the oxidation of olefins by means of hydroperoxides to give olefin oxides (oxiranes), the selectivity of olefin oxide formation decreases significantly and the level of undesirable secondary reactions increases as the olefin conversion rises. To be able to achieve a high selectivity of over 95% despite this, these reactions are, especially on an industrial scale, therefore preferably carried out only to an olefin conversion of about 60–95%.

Isolating the unreacted olefin from the reaction process and then recirculating it to the oxidation process is also known. Thus, a process in which a gas mixture comprising the olefin and oxygen originating from the decomposition reaction of the hydrogen peroxide used as hydroperoxide in the oxidation is separated off and the olefin is absorbed from the gas mixture in a liquid absorption medium has been proposed. In this process, a sufficient amount of an inert gas is added to the oxygen to prevent formation of flammable gas compositions (EP-B-0 719 768 B1). In a preferred embodiment, this process of EP-B-0 719 768 B1 is used for recovering propene from the reaction of propene with hydrogen peroxide to give propene oxide. The inert gas used is preferably methane and the liquid absorption medium used is a mixture comprising isopropanol and water.

Lower hydrocarbons such as heptane and octane and also methanol and acetone can also be used, but less advantageously, in this process. However, a disadvantage of the abovementioned process is that a further gas, in particular methane, in addition to the offgas stream has to be fed into the column used for the absorption. This measure is intended to prevent the formation of explosive mixtures in the gas mixture as a result of the oxygen content. The low solubility of the olefin in water-containing isopropanol is also a disadvantage in this process. For example, based on the description, it is necessary to use solvent mixtures which have a water content of from 30.6 mol % to 57.2 mol %. This high water content reduces the solubility of the olefin in the isopropanol. For this reason, relatively large amounts of solvent have to be used in order to be able to recover the olefin from the offgas stream by absorption.

EP-A-0 583 828 discloses a direct-oxidation ethylene oxide process wherein ethylene oxide resulting from the direct oxidation is absorbed and thus separated from the epoxidation product stream. As absorption agents, especially suitable are mixtures of C10 to C13 paraffins. Explicitly, dodecane and tridecan are described. Higher paraffins are described as possible but less effective. Although a process is described where a stream comprising an olefin may be compressed, EP-A-0 583 828 is silent on a process which comprises two subsequent steps, the first step being a compressing step and the second step being a cooling step. Moreover, EP-A-0 583 828 is directed to a process in which, prior to the absorption of ethylene, carbon dioxide has to be removed from the gas stream, and the compressing step is described as being essential for removal of carbon dioxide only.

DE-AS-1 212 507 describes a method for producing alkylene oxides from alkenes such as propene using oxygen containing gases wherein the alkene is separated from a gas mixture by absorption in a hydrocarbon having a high boiling point, e.g. tetradecane. In the context of this document, it is described that a gas stream comprised of oxygen or a gas stream comprising oxygen is used for removing the alkene from the absorbing agent, the resulting gas stream being recirculated to the oxidation process. In the context of DE-AS-1 212 507, a process step is described in which a gas stream which, after a washing step, contains propene, nitrogen, carbon oxide and carbonic acid, is divided and one part is compressed and subsequently, without cooling, introduced into an absorber where the gas stream is brought in contact with diesel oil.

U.S. Pat. No. 5,599,955 discloses a method for producing propene oxide wherein, in an epoxidation zone, a propene stream is epoxidized using an aqueous hydrogen peroxide solution. An offgas stream resulting from this epoxidation containing unreacted propene is dried in a drier filled with absorbent, the resulting stream being recirculated to a olefin production zone.

WO 02/102496 A1 describes a method for the recovery of combustible components of a gas stream comprising the combustible components and oxygen by selective absorption of the combustible components in a solvent. As combustible components, propene oxide and propene are mentioned. As suitable solvents, usual organic solvents such as alcohols, aromatic and aliphatic hydrocarbons or ketones are generically disclosed. As preferred solvent, compounds are described the gas stream is derived from prior to the absorption. According to WO 02/102496 A1, the gas stream comprising combustible components is directly introduced into the absorption unit, and neither a step of compressing nor a step of cooling is mentioned.

It is an object of the present invention to provide an improved method for separating an olefin from a gas stream, said gas stream comprising the olefin and at least one other component, by means of which it is possible to achieve a more effective recovery of the olefin said the gas stream than in the process of the prior art.

It is a further object of the present invention to provide an improved process for separating an olefin from a gas stream, said gas stream additionally comprising oxygen, by an absorption process wherein no additional inert gas has to be added to the absorption unit used.

SUMMARY OF THE INVENTION

The present invention provides a method of separating an olefin from a gas stream, said gas stream comprising the olefin and at least one other component, said method comprising (i) compressing and cooling the gas stream;
(ii) separating the olefin from the gas stream by absorbing the olefin in an absorbent;
(iii) separating the olefin from the absorbent by desorption;

wherein compressing or cooling or compressing and cooling in (i) is carried out at least twice.

The present invention provides a method of separating propene from a gas stream, comprising the propene and at least one other component, said method comprising (i) compressing and cooling the gas stream;
(ii) separating the propene from the gas stream by absorbing the propene in an absorbent;
(iii) separating the propene from the absorbent by desorption;

wherein compressing or cooling or compressing and cooling in (i) is carried out twice or three times.

The present invention provides a method of separating an olefin from a gas stream, comprising the olefin and at least one other component, said method comprising (i) compressing and cooling the gas stream;
(ii) separating the olefin from the gas stream by absorbing the olefin in an absorbent, said absorbent having a boiling point of from 200 to 300° C. at standard pressure and being a mixture of hydrocarbons $C_nH_{2n+2}$ wherein n is from 10 to 20, said mixture comprising the hydrocarbon $C_{14}H_{30}$ in an amount of 30 percent by weight of the mixture or more;
(iii) separating the olefin from the absorbent by desorption;

wherein compressing or cooling or compressing and cooling in (i) is carried out twice or three times.

The present invention provides a method of separating propene from a gas stream, said gas stream being an offgas stream of an epoxidation process, said epoxidation process comprising reacting propene with hydrogen peroxide in the presence of a titanium zeolite catalyst and methanol as solvent to give a product stream, said epoxidation process further comprising separating propene oxide from said product stream to give said offgas stream, said offgas stream comprising propene, methanol, and water, said method comprising (i) compressing the offgas stream at a pressure of from 13 to 18 bar and cooling the compressed offgas stream at a temperature of from 30 to 45° C. and repeating compressing and cooling once or twice, wherein from 50 to 80 percent by weight of the propene, from 60 to 99 percent by weight of the methanol and/or from 45 to 90 percent by weight of the water, comprised in the offgas stream, are condensed and recirculated into said epoxidation reaction;
(ii) separating the propene from the compressed and cooled offgas stream by absorbing the propene at a pressure of from 13 to 18 bar in an absorbent, said absorbent having a boiling point of from 200 to 300° C. at standard pressure and being a mixture of hydrocarbons $C_nH_{2n+2}$ wherein n is from 13 to 15, said mixture comprising the hydrocarbon $C_{14}H_{30}$ in an amount of 30 percent by weight of the mixture or more;
(iii) separating the propene from the absorbent by desorption in a separation column at a pressure of from 12 to 28 bar and a temperature of from 50 to 200° C., and recirculating the absorbent into (ii);
(iv) recirculating the propene stream obtained in (iii) into said epoxidation reaction.

The present invention provides an integrated process for producing propene oxide, said process comprising reacting propene with hydrogen peroxide in the presence of a titanium zeolite catalyst and methanol as solvent to give a product stream, said product stream comprising propene, propene oxide, methanol, and water, said process further comprising separating propene oxide from said product stream to give the offgas stream, comprising propene, methanol, at least one inert gas, 7 wt.-% oxygen or less, and water, said integrated method further comprising (i) compressing the offgas stream at a pressure of from 13 to 18 bar and cooling the compressed offgas stream at a temperature of from 30 to 45° C. and repeating compressing and cooling once or twice, wherein from 50 to 80 percent by weight of the propene, from 60 to 99 percent by weight of the methanol and/or from 45 to 90 percent by weight of the water, comprised in the offgas stream, are condensed and recirculated into said epoxidation reaction;
(ii) separating the propene from the compressed and cooled offgas stream by absorbing the propene at a pressure of from 13 to 18 bar in an absorbent, said absorbent having a boiling point of from 200 to 300° C. at standard pressure and being a mixture of hydrocarbons $C_nH_{2n+2}$ wherein n is from 13 to 15, said mixture comprising the hydrocarbon $C_{14}H_{30}$ in an amount of 30 percent by weight of the mixture or more;
(iii) separating the propene from the absorbent in a separation column at a pressure of from 16 to 25 bar and a temperature of from 50 to 200° C., recirculating the propene obtained in (iii) into said epoxidation reaction, purifying the absorbent obtained in a forced circulation vaporizer at a pressure of from 0.5 to 4 bar and recirculating the purified absorbent into (ii).

The present invention provides an integrated process for producing propene oxide, said process comprising reacting propene with hydrogen peroxide in the presence of a titanium zeolite catalyst and methanol as solvent to give a product stream, said product stream comprising propene, propene oxide, methanol, and water, said process further comprising separating propene oxide from said product stream to give the offgas stream, comprising propene, methanol, at least one inert gas, 7 wt.-% oxygen or less, and water, said integrated method further comprising (i) compressing the offgas stream at a pressure of from 13 to 18 bar and cooling the compressed offgas stream at a temperature of from 30 to 45° C. and repeating compressing and cooling once or twice, wherein from 50 to 80 percent by weight of the propene, from 60 to 99 percent by weight of the methanol and/or from 45 to 90 percent by weight of the water, comprised in the offgas stream, are condensed and recirculated into said epoxidation reaction;
(ii) separating the propene from the compressed and cooled offgas stream by absorbing the propene at a pressure of from 13 to 18 bar in an absorbent, said absorbent having a boiling point of from 200 to 300° C. at standard pressure and being a mixture of hydrocarbons $C_nH_{2n+2}$ wherein n is from 13 to 15, said mixture comprising the hydrocarbon $C_{14}H_{30}$ in an amount of 30 percent by weight of the mixture or more;
(iii) separating the propene from the absorbent in a separation column at a pressure of from 16 to 25 bar and a temperature of from 50 to 200° C., recirculating the propene obtained in (iii) into said epoxidation reaction, purifying the absorbent obtained in a forced circulation vaporizer at a pressure of from 0.5 to 4 bar and recirculating the purified absorbent into (ii);

(iv) recirculating the propene stream obtained in (iii) into said epoxidation reaction;

(v) partially recirculating the bottoms stream obtained from an absorption column used in (ii), into said absorption column.

DETAILED DESCRIPTION OF THE INVENTION

The present invention provides a method of separating an olefin from a gas stream, said gas stream comprising the olefin and at least one other component, said method comprising (i) compressing and cooling the gas stream;

(ii) separating the olefin from the gas stream by absorbing the olefin in an absorbent;

(iii) separating the olefin from the absorbent by desorption;

wherein compressing or cooling or compressing and cooling in (i) is carried out at least twice.

Therefore, the gas stream may be compressed twice and cooled once. Therefore, it is possible to compress the gas stream, to cool the compressed gas stream and to compress the cooled gas stream. It is also possible to compress the gas stream twice and subsequently cool the gas stream. It is also possible to cool the gas stream, compress the cooled gas stream and cool the resulting compressed gas stream. According to a preferred embodiment, compressing and cooling is carried out at least twice. Therefore, according to one embodiment of the present invention, a gas stream comprising the olefin and at least one other component is compressed, the compressed gas stream is cooled, the cooled gas stream is compressed again and the compressed gas stream is cooled again. According to an especially preferred embodiment, compressing and cooling is carried out three times wherein, according to an especially preferred embodiment, after a compressing step a cooling step is performed.

According to a preferred embodiment of the present invention, the gas stream comprises the olefin and at least one further compound which may be separated from the olefin by cooling the compressed gas stream. Thus, the gas stream comprising the olefin and said at least one further compound is preferably compressed to a suitable pressure in at least one compressing apparatus and subsequently cooled to a suitable temperature in at least one suitable cooling apparatus wherein, in the at least one suitable cooling apparatus, at least one of the further compounds is at least partially, preferably essentially completely condensed whereas the olefin is only partially condensed. The process according to the present invention is preferably carried out so that at least one of the further compounds is essentially removed from the gas stream by the compressing and cooling steps.

According to a preferred embodiment of the present invention, the gas stream introduced in (i) comprises the olefin, at least one alcohol, preferably methanol, and water, the olefin especially preferably being propene. In this case, it is preferred to compress the gas stream, preferably by compressing and cooling twice, even more preferably by compressing and cooling three times, to a preferred final pressure, after the final cooling step, in the range of from 2 to 30 bar, more preferably of from 5 to 25 bar, more preferably of from 10 to 20 bar, more preferably of more than 10 bar to 20 bar, more preferably in the range of from 11 to 19 bar, and still more preferably in the range of from 13 to 18 bar.

In each compression step, the compression ratio is in the preferred range of from 1.5 to 4, more preferably from 1.7 to 3.3, more preferably from 2 to 3 and especially preferably of from 2.2 to 2.7.

Compression can be carried out using the customary apparatuses, for example piston compressors, diaphragm compressors, screw compressors and rotary compressors. It is possible the use different apparatuses for each compression step. Use of the same type of apparatus for all compression steps is preferred.

After each compression step, the compressed gas stream comprising olefin, preferably propene, at least one alcohol, preferably methanol, and water, is cooled to a temperature in the preferred range of from 20 to 70° C. more preferably from 30 to 60° C., more preferably from 20 to 50° C., still more preferably in the range of from 25 to 50° C. and especially preferably in the range of from 30 to 45° C.

Cooling can be carried out using customary apparatuses, such as heat exchangers which can have essentially any configuration. Examples of configurations of the heat exchanger are shell-and-tube heat exchangers, coil heat exchangers or plate heat exchangers. For the purposes of the present invention, preference is given to using a heat exchanger which is configured as a shell-and-tube heat exchanger. As coolant, any conceivable medium can be employed. Preferred coolants are, among others, common river water or secondary coolants such as secondary cooling water.

According to a preferred embodiment of the present invention where compression is preferably carried out not in one stage but in at least two, more preferably three stages with cooling between the individual compression stages, the present process has the advantage of the final compression temperature being able to be readily kept within the permissible range.

According to the present invention, it is preferred that of from 30 to 90 wt.-%, more preferably from 35 to 85 wt.-%, more preferably from 40 to 85 wt.-% and especially preferably from 50 to 80 wt.-% of the olefin, preferably propene, comprised in the gas stream are condensed in (i), preferably after at least two compressing and two cooling steps and especially after three compressing steps and three cooling steps.

It is preferred that of from 40 to 99 wt.-%, more preferably from 50 to 99 wt.-% and especially preferably from 60 to 99 wt.-% of the methanol comprised in the gas stream are condensed in (i), preferably after at least two compressing and two cooling steps and especially after three compressing steps and three cooling steps.

It is preferred that of from 35 to 99 wt.-%, more preferably from 40 to 99 wt.-%, more preferably from 40 to 95 wt.-% and especially preferably from 45 to 90 wt.-% of the water comprised in the gas stream are condensed in (i), preferably after at least two compressing and two cooling steps and especially after three compressing steps and three cooling steps.

The gas stream introduced in (i) may further comprise olefin oxide corresponding to the olefin. It is preferred that of from 60 to 100 wt.-%, more preferably from 70 to 100 wt.-% and especially preferably from 80 to 100 wt.-% of the olefin oxide comprised in the gas stream are condensed in (i), preferably after at least two compressing and two cooling steps and especially after three compressing steps and three cooling steps.

The gas stream introduced in (i) may further comprise an alkane corresponding to the olefin. In case the olefin is propene, the corresponding alkane is propane. It is preferred that of from 30 to 90%, more preferably from 40 to 90% and especially preferably from 45 to 90% of the alkane comprised in the gas stream are condensed in (i), preferably after at least two compressing and two cooling steps and especially after three compressing steps and three cooling steps.

According to a preferred embodiment of the present invention where the gas stream introduced in (i) is compressed three times in partial compressing steps (a1), (b1) and (c1) and, after each compression step, the respective compressed gas stream is cooled in partial cooling steps (a2), (b2) and (c2), the following compressing and cooling parameters are preferred:

(a1) compressing the gas stream to a pressure in the range of from 1.2 to 4 bar, preferably of from 1.5 to 3.5 bar and especially preferably of from 2 to 3 bar;

(a2) cooling the compressed gas stream to a temperature in the range of from 20 to 50° C., preferably of from 25 to 45° C. and especially preferably of from 30 to 40° C., obtaining a condensate (Ca) and a gas stream (Ga);

(b1) compressing the gas stream (a) to a pressure in the range of from 3 to 10 bar, preferably of from 4 to 9 bar and especially preferably of from 5 to 7 bar;

(b2) cooling the compressed gas stream (a) to a temperature in the range of from 20 to 58° C., preferably of from 25 to 45° C. and especially preferably of from 30 to 40° C., obtaining a condensate (Cb) and a gas stream (Gb);

(c1) compressing the gas stream (b) to a pressure in the range of from 7.5 to 25 bar, preferably of from 11 to 20 bar and especially preferably of from 13 to 18 bar;

(c2) cooling the compressed gas (b) stream to a temperature in the range of from 20 to 55° C., preferably of from 25 to 50° C. and especially preferably of from 30 to 45° C., obtaining a condensate (Cc) and a gas stream (Gc).

The condensate resulting from of each cooling step may be collected and re-used for one or more purposes, e.g. introduced in at least one chemical process.

According to a still more preferred embodiment of the present invention, the gas stream introduced in (i) is an offgas stream from a chemical process in which the olefin is a starting material and the alcohol is preferably used as solvent, and where the water is used as solvent or part of a solvent mixture and/or results from a respective chemical reaction during the chemical process. In this case, the condensate resulting from of each cooling step is preferably recirculated into said chemical process. Depending on the exact composition of the respective condensate, it is possible to recirculate one, two or more condensates into the chemical process. According to a preferred embodiment, the all condensates resulting from the three cooling steps are recirculated to the chemical process. It is also possible to only partially recirculate the condensate or condensates and work up the remaining part of the condensate or condensates and/or introduce the remaining part of the condensate or condensates into at least one other chemical process and/or discard the remaining part of the condensate or condensates.

Preferably, the gas stream comprising the olefin and at least one further compound, preferably the olefin, an alcohol and water and optionally at least one further compound, more preferably propene, methanol and water and optionally propene oxide and optionally propane, may be an offgas stream from any suitable chemical process or combination of at least two chemical processes.

According to a still more preferred embodiment of the present invention, the gas stream comprising the olefin and at least one other compound is an offgas stream resulting from an epoxidation process, said process comprising reacting the olefin with a hydroperoxide to give a product stream comprising olefin and olefin oxide and at least one other component, and separating the olefin oxide from said product stream to give the offgas stream.

This epoxidation reaction is preferably carried out using, as olefin, a compound being selected from the group consisting of ethene, propene, 1-butene, 2-butene, isobutene, butadiene, pentenes, piperylene, hexenes, hexadienes, heptenes, octenes, diisobutene, trimethylpentene, nonenes, dodecene, tridecene, tetradecene to eicosene, tripropene and tetrapropene, polybutadienes, polyisobutenes, isoprene, terpenes, geraniol, linalool, linalyl acetate, methylenecyclopropane, cyclopentene, cyclohexene, norbornene, cycloheptene, vinylcyclohexane, vinyloxirane, vinylcyclohexene, styrene, cyclooctene, cyclooctadiene, vinylnorbornene, indene, tetrahydroindene, methylstyrene, dicyclopentadiene, divinylbenzene, cyclododecene, cyclododecatriene, stilbene, diphenylbutadiene, vitamin A, beta-carotene, vinylidene fluoride, allyl halides, crotyl chloride, methallyl chloride, dichlorobutene, allyl alcohol, methallyl alcohol, butenols, butenediols, cyclopentenediols, pentenols, octadienols, tridecenols, unsaturated steroids, ethoxyethene, isoeugenol, anethole, unsaturated carboxylic acids such as acrylic acid, methacrylic acid, crotonic acid, maleic acid, vinyl acetic acid, unsaturated fatty acids such as oleic acid, linoleic acid, palmitic acid, naturally occurring fats and oils. Preferred olefins have from 2 to 6 carbon atoms, more preferably from 2 to 5 carbon atoms and still more preferably from 2 to 4 carbon atoms. Especially preferred olefins are ethene, propene, and butenes, with propene being especially preferred.

In a preferred embodiment of present invention, at least one hydroperoxide is reacted with the olefin. For the purposes of the present patent application, the term "hydroperoxide" refers to a compound of the formula ROOH. Details regarding the preparation of hydroperoxides and regarding hydroperoxides which can be used, inter alia, in the process of the present invention may be found in DE-A-198 35 907. Examples of hydroperoxides which can be used for the purposes of the present invention are, inter alia, tert-butyl hydroperoxide, ethylbenzene hydroperoxide, tert-amyl hydroperoxide, cumene hydroperoxide, cyclohexyl hydroperoxide, methylcyclohexyl hydroperoxide, tetrahydronaphthalene hydroperoxide, isobutylbenzene hydroperoxide, ethylnaphthalene hydroperoxide, peracids such as peracetic acid and hydrogen peroxide. Mixtures of two or more hydroperoxides can also be used according to the present invention. Preference is given to using hydrogen peroxide as hydroperoxide in the process of the present invention, and further preference is given to using an aqueous hydrogen peroxide solution. Most preferably, the aqueous hydrogen peroxide solution comprises hydrogen peroxide in a concentration in the range of from 1 to 90, more preferably of from 10 to 70 and especially preferably of from 30 to 50 percent by weight, based on the total weight of the solution.

Accordingly, the present invention also provides a process as described above in which the hydroperoxide the olefin, more preferably an olefin having from 2 to 6 carbon atoms, still more preferably of from 2 to 4 carbon atoms, most preferably propene is reacted with, is hydrogen peroxide.

As to a preferred embodiment of the present invention, the alcohol comprised in the gas stream introduced in (i) is methanol. It is also possible that this gas stream additionally comprises at least one further alcohol or, instead of methanol, at least one other alcohol. Therefore, according to the above-mentioned preferred embodiment according to which the gas stream is an offgas stream resulting from an epoxidation reaction, this may be the case if the epxodiation reaction is carried out in a solvent mixture comprising methanol and at least one other alcohol or in a solvent mixture comprising at least one alcohol which is not methanol.

The epoxidation reaction is preferably carried out in at least one alcohol having less than 6 carbon atoms, for example methanol, ethanol, propanols such as 1-propanol or 2-propanol, butanols such as 1-butanol, 2-butanol, iso-butanol, tert-butanol, and pentanols, or diols or polyols, preferably diols or polyols having less than 6 carbon atoms, or mixtures of two or more of these compounds. If the epxoidation reaction is carried out in a solvent mixture comprising water wherein the water may be introduced as such and/or via, e.g., an aqueous hydroperoxide solution such as an aqueous hydrogen peroxide solution, preferred mixtures comprises methanol and water or ethanol and water or methanol, ethanol and water, a mixture of methanol and water being especially preferred. Therefore, the gas stream introduced in (i) may comprise at least one of the above-mentioned alcohols, optionally together with water, more preferably methanol and water or ethanol and water or methanol, ethanol and water, especially preferably methanol and water.

In case the chemical process in which the olefin is introduced as starting material, e.g. an epoxidation reaction, is carried out in the presence of at least one compound such as esters such as methyl acetate or butyrolactone;
amides such as dimethylformamide, dimethylacetamide or N-methylpyrrolidone;
ketones such as acetone;
nitrils such as acetonitril;

the gas stream introduced in (i) may also comprise at least one of these compounds.

According to an especially preferred embodiment of the present invention, the epoxidation reaction is carried out in the presence of at least one catalyst, preferably at least one heterogeneous catalyst, still more preferably at least one zeolite catalyst. As far as the least one zeolite catalyst is concerned, generally no limitations exist. Particularly preferred, a zeolite containing titanium is employed, wherein zeolites known to the person skilled in the art as "titanium silicates" (TS) are particularly preferred. Such zeolites containing titanium, in particular those having a crystalline structure of the MFI-type as well as ways for producing them are described, for example, in WO 98/55228, EP-A-0 311 983, or EP-A-0 405 978. The respective content of these documents is hereby incorporated by reference. In addition to Si and Ti, said zeolite materials may contain additional elements, such as aluminum, zirconium, tin, iron, cobalt, nickel, gallium, bor, or small amounts of fluorine. It is possible that the titanium of the zeolite is partly or completely replaced by vanadium, zirconium, or niobium, or any mixture of two or more of these components. Zeolites containing titanium and displaying a MFI-structure are known to yield a characteristic pattern in x-ray diffraction. Furthermore, these materials display a vibration band in the infrared (IR) at approximately 960 $cm^{-1}$. Therefore, it is possible to distinguish the zeolites containing titanium from crystalline or amorphous $TiO_2$-phases or from alkaline metal titanates. In a further preferred embodiment, the at least one zeolite catalyst comprises at least one of the elements titanium, germanium, tellurium, vanadium, chromium, niobium, zirconium. Particularly preferred are zeolite catalysts having a pentasil zeolite structure, in particular the structural types that can be, via x-ray diffraction, assigned to the structure types of ABW-, ACO-, AEI-, AEL-, AEN-, AET-, AFG-, AFI-, AFN-, AFO-, AFR-, AFS-, AFT-, AFX-, AFY-, AHT-, ANA-, APC-, APD-, AST-, ATN-, ATO-, ATS-, ATT-, ATV-, AWO-, AWW-, BEA-, BIK-, BOG-, BPH-, BRE-, CAN-, CAS-, CFI-, CGF-, CGS-, CHA-, CHI-, CLO-, CON-, CZP-, DAC-, DDR-, DFO-, DFT-, DOH-, DON-, EAB-, EDI-, EMT-, EPI-, ERI-, ESV-, EUO-, FAU-, FER-, GIS-, GME-, GOO-, HEU-, IFR-, ISV-, ITE-, JBW-, KFI-, LAU-, LEV-, LIO-, LOS-, LOV-, LTA-, LTL-, LTN-, MAZ-, MEI-, MEL-, MEP-, MER-, MFI-, MFS-, MON-, MOR-, MSO-, MTF-, MTN-, MTT-, MTW-, MWW-, NAT-, NES-, NON-, OFF-, OSI-, PAR-, PAU-, PHI-, RHO-, RON-, RSN-, RTE-, RTH-, RUT-, SAO-, SAT-, SBE-, SBS-, SBT-, SFF-, SGT-, SOD-, STF-, STI-, STT-, TER-, THO-, TON-, TSC-, VET-, VFI-, VNI-, VSV-, WIE-, WEN-, YUG-, ZON, as well as mixed structures of at least two or more of the aforementioned structures. Furthermore, it is conceivable to use zeolite catalysts containing titanium with the structure of ITQ-4, ITQ-9, SSZ-24, TTM-1, UTD-1, CIT-1 or CIT-5. Furthemorer zeolites containing titanium are such of the structure types ZSM-48 or ZSM-12. Zeolites containing titanium of the structure MFI, MEL or MFI/MEL mixed structures, as well as MWW, BEA or mixed structures thereof are preferred in the context of the present invention. Further preferred in the context of the present invention are these zeolite catalysts containing titanium that are referred to, in general, as "TS-1", "TS-2" or "TS-3", as well as zeolites containing titanium displaying a structure that is isomorphous to zeolite beta.

Therefore, the present invention also provides a process wherein the gas stream introduced in (i) is an offgas stream resulting from an epoxidation reaction where an olefin, preferably propene, is reacted with a hydroperoxide, preferably hydrogen peroxide, to give the respective olefin oxide, preferably propene oxide, wherein the epoxidation reaction is preferably carried out in at least one solvent, preferably at least one alcohol, more preferably methanol, still more preferably in a solvent comprising at least one alcohol and water, more preferably methanol and water, and wherein the epoxidation reaction is preferably carried out in the presence of at least one catalyst, more preferably at least one heterogeneous catalyst, more preferably at least one zeolite catalyst, and still more preferably a titanium silicalite catalyst.

The term "an offgas stream resulting from a chemical process" or "an offgas stream resulting from a chemical reaction" as used in the context of the present invention relates to a gas stream which directly results from said process or reaction or which results from the work-up of a gas stream directly resulting from said process or reaction. This work-up may comprise, e.g., partial or complete separation of at least one compound comprised in the gas stream directly resulting from said process or reaction, addition of at least one compound to the gas stream directly resulting from said process or reaction, or a temperature and/or pressure treatment of the gas stream directly resulting from said process or reaction.

The reaction of the olefin, preferably propene, with the hydroperoxide, preferably hydrogen peroxide, in the presence of the solvent or solvents, preferably methanol, and the catalyst or catalysts, preferably the above-described titanium silicalite catalyst, can be carried out in one, two or more stages.

A two-stage reaction takes place, for example, as follows:
(a) the hydroperoxide, preferably the hydrogen peroxide, is reacted with the olefin, preferably propene, to give a mixture comprising olefin oxide, preferably propylene oxide, and unreacted hydroperoxide, preferably hydrogen peroxide;
(b) at least one compound, for examples the olefin oxide, preferably propylene oxide, is separated off from the mixture resulting from stage (a);
(c) reacting the hydroperoxide, preferably the hydrogen peroxide, comprised in the mixture from which the at least one compound, preferably the olefin oxide, more preferably the propylene oxide, was separated off in (b), with olefin.

Accordingly, the reaction of the olefin with hydroperoxide takes place, as indicated above, in two stages (a) and (c) between which there is a separation stage (b). The isolation of the at least one compound separated off in (b), preferably propylene oxide, can, for the purposes of the present invention, be carried out using all customary separation methods of the prior art. The at least one compound is preferably separated off by distillation. Depending on the requirements of the process, it can be separated off in one or more distillation columns. Preference is given to using one distillation column in a separation stage.

The reaction of the olefin, preferably propene, with hydroperoxide, preferably hydrogen peroxide in the process of the present invention takes place in a reactor suitable for this purpose. The starting materials can be introduced individually into the reactor or preferably be combined to form a single stream before being fed into the reactor. In the process of the present invention, preference is given to introducing one stream which consists of a combination of the starting materials into the reactor. Here, preference is given to a stream in which the concentrations of the individual starting materials forming the stream are selected so that the stream is liquid and consists of a single phase. As starting materials are preferably olefin, solvent and hydroperoxide. In a further, preferred embodiment, it is possible to carry out the reaction in stages (a) and (c) in two separate reactors. As reactors, it is of course possible to use all conceivable reactors which are best-suited to the respective reaction. Here, the term "a reactor" is not restricted to a single vessel. Rather, it is also possible to use a cascade of stirred vessels as reactor. Preference is given to using fixed-bed reactors as reactors. The fixed-bed reactors used are more preferably fixed-bed tube reactors. In the case of reactions in two separate reactors in stages (a) and (c), particular preference is given to using one isothermal fixed-bed tube reactor and one adiabatic fixed-bed reactor. Preference is given to using the isothermal fixed-bed tube reactor in stage (a) and the adiabatic fixed-bed reactor in stage (c).

After the reaction of the olefin, preferably propene, with hydroperoxide, preferably hydrogen peroxide, a mixture is obtained comprising olefin oxide, preferably propene oxide, unreacted alkene, preferably propene, and solvent, preferably methanol and water, and optionally alkane, preferably propane. According to a preferred embodiment, unreacted olefin, preferably propene, is separated off from this mixture. The unreacted olefin is preferably separated off from said mixture by distillation. It is in principle possible to use any number of columns for this purpose. Preference is given to using one column. This column generally has 5 or more, preferably 10 or more and more preferably 15 or more theoretical plates. The distillation in this column is preferably carried out at pressures in the range from 0.5 to 25 bar, preferably from 0.7 to 5 bar and particularly preferably in the range from 0.9 to 1.5 bar. In order to obtain better regulation of the distillation, at least one inert gas, preferably nitrogen, is introduced in a preferred amount of up to 5 wt.-%, preferably from 0.01 to 5 wt.-%, more preferably of from 0.05 to 2 wt.-% and especially preferably of from 0.1 to 1 wt.-%, relative to the olefin, preferably propene.

According to this preferred embodiment of the present invention, a gas stream is obtained comprising olefin, preferably propene, preferably in the range of from 20 to 95 wt.-%, more preferably of from 30 to 94 wt.-% and still more preferably of from 40 to 93 wt.-%, based on the total weight of the gas stream.

Moreover, the gas stream generally comprises 10 wt.-% or less, preferably 7 wt.-% or less and more preferably 5 wt.-% or less of oxygen which originates from the decomposition reaction of the hydroperoxide used, based on the total weight of the gas stream.

Moreover, the gas stream may comprise up to 5 wt.-%, more preferably of from 0.01 to 5 wt.-%, more preferably of from 0.05 to 3 wt.-% and still more preferably of from 0.1 to 2 wt.-% of inert gas, preferably nitrogen, based on the total weight of the gas stream.

Moreover, the amount of propene oxide comprised in the gas steam is so small that it is not detectable.

As further components, the gas stream generally comprises solvent, preferably methanol, preferably in the range of up to 15 wt.-%, more preferably of from 0.1 to 15 wt.-%, more preferably of from 0.5 to 10 wt.-% and still more preferably of from 1 to 5 wt.-%, and water preferably in the range of up to 5 wt.-%, more preferably of from 0.01 to 5 wt.-%, more preferably of from 0.05 to 2 wt.-% and still more preferably of from 0.1 to 1 wt.-%, each based on the total weight of the gas stream.

Moreover, the gas stream may comprise up to 20 wt.-%, more preferably of from 0.1 to 20 wt.-%, more preferably of from 1 to 15 wt.-% and still more preferably of from 2 to 10 wt.-% of alkane, preferably propane, based on the total weight of the gas stream.

This preferably obtained gas stream is introduced in step (i) of the process of the present invention.

After step (i), most perferably after partial step (c2), a cooled gas stream is obtained comprising olefin, preferably propene preferably in the range of from 20 to 95 wt.-%, more preferably of from 40 to 94 wt.-% and still more preferably of from 70 to 93 wt.-%, based on the total weight of the gas stream.

Moreover, the cooled gas stream after (i) generally comprises 10 wt.-% or less, preferably 9 wt.-% or less and more preferably 8 wt.-% or less of oxygen which originates from the decomposition reaction of the hydroperoxide used, based on the total weight of the gas stream.

Moreover, the cooled gas stream after (i) may comprise up to 5 wt.-%, more preferably of from 0.01 to 5 wt.-%, more preferably of from 0.05 to 3 wt.-% and still more preferably of from 0.1 to 2.5 wt.-% of inert gas, preferably nitrogen, based on the total weight of the gas stream.

As further components, the cooled gas stream after (i) generally comprises solvent, preferably methanol of up to 10 wt.-%, preferably in the range of from 0.01 to 10 wt.-%, more preferably of from 0.1 to 5 wt.-% and still more preferably of from 0.5 to 2.5 wt.-%, and water of up to 5 wt.-%, preferably in the range of from 0.01 to 5 wt.-%, more preferably of from 0.05 to 2 wt.-% and still more preferably of from 0.1 to 1 wt.-%, each based on the total weight of the gas stream.

Moreover, the cooled gas stream after (i) may comprise up to 10 wt.-%, preferably of from 0.1 to 10 wt.-%, more preferably of from 1 to 9 wt.-% and still more preferably of from 2 to 8 wt.-% of alkane, preferably propane, based on the total weight of the gas stream.

At least one of the condensates resulting from of each cooling step, especially preferably all condensates resulting from cooling steps (a2), (b2) and (c2), are preferably collected and re-used for one or more purposes, e.g. introduced in at least one chemical process. More preferably, the condensates are recirculated into an epoxidation process, still more preferably into the epoxidation process the gas stream introduced in (i) results from.

The plurality of compressing and cooling steps according to the preferred embodiment of the present invention displays at least three major improvements compared to the processes of the prior art: First, advantage is taken of the increased solubility of the olefin at higher pressures which simplifies a first separation and recirculation of the olefin which is based on the partial condensation of the olefin in (i). Thus, a first integrated process feature is provided. Second the solvents comprised in the gas stream introduced in (i), preferably methanol and water resulting from an epoxidation process, can be essentially completely condensed and preferably recirculated into the epoxidation reaction as starting materials, thus providing a second integrated process feature. These features of direct recirculation of one or more compounds therefore lead to a decrease of the total economic cost of the overall process. Recirculation into the epoxidation is inter alia possible since compressing and cooling according to (i) leads to condensates which comprises only a very small amount of oxygen. Third, the gas stream according to (i) is compressed so that the solubility of the absorbent used in the subsequent step (ii) is enhanced. However, in spite of compressing and concentrating the gas stream in (i), the gas stream resulting from (i) has an oxygen content of less than 9 percent by volume which means that the preferred gas streams obtained from (i) are not within the explosive area. The term "explosive area" as used in the context of the present invention refers to the range of the molar ratio of propene:oxygen in which the mixture comprising propene and oxygen is an explosive mixture.

The gas stream obtained after step (i), preferably after (c2), having a preferred pressure of more than 7.5 bar to 25 bar, preferably of from 11 to 20 bar and especially preferably of from 13 to 18 bar, and a preferred temperature of from 20 to 55° C., preferably of from 25 to 50° C. and especially preferably of from 30 to 45° C., is then introduced in step (ii) of the process according to the invention where the olefin is separated from the gas stream introduced in (ii) by absorbing the olefin in an absorbent.

As absorption apparatus, it is possible to use at least one packed columns and/or at least one tray column and/or at least one bubble column, and/or in special cases, at least one Venturi scrubber. Especially preferably, the at least one apparatus, preferably an absorption column, is operated in countercurrent. The term "countercurrent" as used with respect to the absorption apparatus in the context of the present invention relates to an apparatus in which the gas stream resulting from (i) is introduced in an absorption unit, preferably an absorption column, preferably at a lower section of the unit, and preferably a liquid phase comprising at least one absorbant is introduced upwards with respect to the location where the gas stream is introduced in the unit. Most preferably, the liquid phase exits the absorption unit at a location below the location the gas stream is introduced in the absorption unit.

One further major advantage of a preferred process according to the present invention is the fact that no inert gas such as methane has to be additionally added to the absorption unit.

The pressure the absorption of the olefin, preferably propene, is carried out at, is preferably in the range of from more than 10 to 20 bar, more preferably of from 11 to 19 bar and especially preferably of from 13 to 18 bar such as at a pressure of about 13 or about 14 or about 15 or about 16 or about 17 or about 18 bar.

As at least one absorbent used for the absorption of the olefin, an absorbent or a mixture of two or more adsorbents is employed having a preferred boiling point at standard pressure of from 200 to 300° C., more preferably of from 210 to 285° C. and especially preferably of from 220 to 270° C.

Although there are no particular restrictions as to which absorbant or mixture of absorbants is employed, preference is given to hydrocarbons. The term hydrocarbons encompasses aliphatic, cyclic, alicyclic, saturated, unsaturated and aromatic hydrocarbons which may also be substituted by aliphatic radicals. The hydrocarbons can also be used in the form of mixtures in the process of the present invention. Especially preferred are hydrocarbons having 9 or more, more preferably 10 or more carbon atoms. More preferably, the absorbent is a mixture of hydrocarbons $C_nH_{2n+2}$ wherein n is from 10 to 20. More preferably, n is from 11 to 18, more preferably from 12 to 16 and still more preferably from 13 to 15.

This absorbant being a mixture of hydrocarbons $C_nH_{2n+2}$ preferably comprises the hydrocarbon $C_{14}H_{30}$ in an amount of 10 percent by weight or more of the mixture, more preferably of 20 percent by weight or more, more preferably of 30 percent by weight or more, more preferably of 40 percent by weight or more, more preferably of 50 percent by weight or more, based on the total weight of the mixture of hydrocarbons. Accordingly, it is not necessary for the hydrocarbon $C_{14}H_{30}$ used in the process of the present invention to have a particularly high purity. The mixture described can, for example, be obtained in the refining of crude oil, with the mixture corresponding to the desired fraction being taken off. Further components which can as a result be present in addition to the tetradecane are further saturated hydrocarbons which may also be branched or unbranched, long-chain, cyclic or alicyclic. Unsaturated hydrocarbons or aromatic hydrocarbons may also be present in such a mixture.

Preferably, a column is used for absorbing the olefin, preferably propene. Particular preference is given to a column configured as a packed column, more preferably a packed column containing ordered packing. While the ordered packing mentioned can essentially be of any type, preference is given to packing which has a specific surface area in the range from 100 to 750 $m^2/m^3$. It is possible to use sheet metal packing, for example from Montz (type B1 100 to B1 500) or from Sulzer ChemTech (Mellapak 125 to Mellapak 750), or mesh packing from Montz (type A3 500 to A3 750) or from Sulzer ChemTech (type BX or CY). The unit $m^2/m^3$ refers to the geometric surface area of the material forming the packing per cubic meter of packing.

The preferred pressure of from more than 10 bar to 20 bar, more preferably of from 11 to 19 bar and especially preferably of from 13 to 18 bar such as at a pressure of about 13 or about 14 or about 15 or about 16 or about 17 or about 18 bar, prevailing in the absorption apparatus increases the solubility of the soluble constituents of the gas stream introduced in (ii), in particular the olefin, in the absorption medium, preferably the hydrocarbon or mixture of hydrocarbons. The pure, insoluble gas constituent then leaves the absorption apparatus preferably at the top of the column. This constituent preferably comprises inert gases such as nitrogen, and oxygen and small amounts of olefin, preferably propene. This insoluble gas constituent can, for example, be passed to incineration.

The pure, insoluble gas constituent preferably obtained at the top of the column comprises of from 10 to 95 wt.-%, preferably of from 30 to 90 wt.-% and still more preferably or from 50 to 85 wt.-% of oxygen.

The pure, insoluble gas constituent preferably obtained at the top of the column comprises of from 1 to 30 wt.-%, preferably of from 2 to 20 wt.-% and still more preferably or from 5 to 15 wt.-% of inert gases such as nitrogen The pure, insoluble gas constituent preferably obtained at the top of the column comprises up to 50 wt.-%, preferably of from 0.01 to 50 wt.-%, more preferably of from 0.1 to 40 wt.-% and still more preferably or from 0.5 to 35 wt.-% olefin, preferably propene.

The olefin-laden absorbent stream, preferably the olefin-laden hydrocarbon stream, obtained at the bottom of the absorption column, preferably comprises 80% or more, more preferably 90% or more, and most preferably 99% or more of the olefin comprised in the gas stream introduced in (ii).

The hydrocarbons used as absorption medium in the present invention have an excellent solvent capacity for olefins, so that the process can be carried out using comparatively small amounts of absorption medium compared to processes where, e.g. mixtures of isopropanol and water, acetone, heptane or octane are used as absorbents. The novel process is therefore extremely advantageous for industrial use. In case the olefin is propene, the ratio of absorbent being a mixture of hydrocarbons $C_nH_{2n+2}$ with n from 13 to 15 comprising $C_{14}H_{30}$ in an amount of 30 percent by weight of the mixture or more, to propene comprised in the gas stream introduced in (ii), is preferably smaller than or equal to 3, more preferably smaller than or equal to 2 and still more preferably smaller than or equal to 1, calculated as mass ratio.

The olefin-laden absorbent stream obtained at the bottom of the column is then passed to step (iii) of the process of the present invention where the olefin is separated from the absorbent by desorption.

According to an especially preferred embodiment of the present invention, one part of the bottoms stream obtained from the absorption column, preferably comprising from 20 to 50 wt.-% of absorbant or absorbant mixture, is not passed to step (iii) but subsequently recirculated into the absorption column. In the context of the present invention, this recirculation is referred to as internal absorbant recirculation. Preferably, from 50 to 98% of the bottoms stream, more preferably from 70 to 95% of the bottoms stream are recirculated. More preferably, this part of the bottoms stream is suitably cooled, prior to recirculation into the absorbtion column to a temperature in a preferred range of from 20 to 45° C., more preferably from 25 to 35° C. According to an especially preferred embodiment of the present invention, the part of the bottoms stream recirculated into the absorption column is introduced in the column above the lower section of the column where the gas stream obtained in (i) is introduced and, still more preferably, below the upper part of the absorption column where the absorbant is preferably introduced via the external absorbant recirculation and/or where the absorbant is introduced as fresh absorbant which had not yet come in contact with olefin. In the context of the present invention, the external absorbant recirculation refers to recirculation of absorbant which has been separated from olefin in (iii) as described hereinunder. It was found that the internal absorbant recirculation is a further major advantage of the method of the present invention since the bottoms stream obtained from the absorption column is typically not completely saturated with olefin. Using this remaining capacity by recirculating a part of the bottoms stream further enhances the integration aspect of the inventive method.

In general, there are no restriction as to the explicit method according to which and the at least one apparatus in which this separation according to (iii) is carried out. Separation by desorption may be preferably carried out, for example, by distillation and/or by vaporization.

According to one embodiment of the present invention, it is possible to separate the olefin from the absorbent and then further purify the olefin. If, e.g., the stream introduced in (iii) comprises absorbent, olefin, and alkane, such as, preferably, a hydrocarbon or a mixture of hydrocarbons, propene and propane, the present invention provides a process in which in step (iii) the absorbent is separated from olefin and alkane, the olefin being subsequently separated from the alkane. According to a preferred embodiment, the absorbent is at least partially recirculated into (ii) as externally recirculated absorbant as it is described hereinabove. According to a further preferred embodiment, the olefin is at least partially recirculated into an epoxidation reaction, preferably an epoxidation reaction the gas stream introduced in (i) results from.

Therefore, according to a preferred embodiment of the present invention, the separation of the olefin, preferably propene, is carried out in a forced circulation vaporizer.

Therefore, the liquid stream resulting from (ii) is passed to a forced circulation vaporizer, the vaporizer being operated at a preferred pressure of from 0.5 to 4 bar, preferably of from 1 to 3 bar, and a preferred temperature of from 60 to 100° C., more preferably from 70 to 95° C. and still more preferably of from 80 to 90° C. The liquid phase obtained from the forced circulation vaporizer has a purity of preferably 90% or more, more preferably 95% or more and still more preferably of 97% or more, with regard to absorbent, preferably the hydrocarbon or hydrocarbons as described above. The gaseous phase obtained in the forced circulation vaporizer comprises the olefin, preferably propene, preferably the alkane, more preferably propane, and 1 wt.-% or less, more preferably 0.5 wt.-% or less of the absorbent.

In general, this gaseous stream may be used for any conceivable purpose. Among others, it may be re-used as starting material for one or more chemical processes such as an epoxidation reaction or used as energy source for steam generation where the steam may be used in one or more chemical processes such as an integrated epoxidation process.

Preferably, the gaseous stream obtained from the vaporizer is cooled in a downstream heat exchanger, to a preferred temperature of from 20 to 40° C., preferably from 25 to 35° C. In this heat exchanger, the absorbent comprised in the gaseous stream is at least partially condensed and preferably recirculated as liquid phase as absorbent into (ii). The gaseous phase obtained from this heat exchanger preferably comprises 0.7 wt.-% or less, more preferably 0.4 wt.-% or less of absorbent, the olefin, preferably propene and optionally the alkane, preferably propane. This gaseous stream is preferably compressed in a downstream compressor, preferably a two-stage compressor, to a pressure of preferably from 10 to 12 bar and subsequently cooled in a heat exchanger to a preferred temperature of from 30 to 40° C. The thus obtained liquid phase, preferably comprising olefin and alkane, most preferably propene and propane, is fed either directly to a reaction stage such as the preferred epoxidation process or to at least one further purification stage or partly to a reaction stage and partly to at least one further purification stage.

According to a preferred embodiment of the present invention, the gas stream introduced in (i) is an offgas stream of an epoxidation process in which an olefin, most preferably proylene is used as olefin in the epoxidation reaction. This propene used for the epoxidation preferably contains propane as saturated hydrocarbon. Preference is given to using fractions which comprise propene and propane in a volume ratio of from about 99.5:0.5 to 94:6. Such mixtures are also referred to as "chemical grade" propene. Preference is given to using propene of this purity in the preparation of propene oxide according to the present invention. Therefore, in a particularly preferred embodiment of the process of the present invention, the offgas stream from the conversion of propene into propene oxide comprises propene as olefin and propane as alkane. In the process of the present invention, this offgas which has been freed of propene and propane is separated off at the top of the absorption apparatus and the absorbent, preferably the hydrocarbon or hydrocarbons as described above, laden with propene and propane, is separated off at the bottom of the absorption column. In the subsequent desorption step (iii) according to the preferred embodiment described above where a forced circulation vaporizer is used, the liquid phase obtained preferably after the two-stage compression and the heat exchanging, the liquid phase preferably comprising olefin and alkane, most preferably propene and propane, is preferably fed to at least one further purification stage.

This purification step where this liquid phase is fractioned into the components propene and propane, is preferably carried out in a $C_3$ splitter as described, for example, in Ullmann's Encyclopedia of Industrial Chemistry, $5^{th}$ Edition, Volume A22, page 214. The separation can be carried out in a column at a pressure of from about 15 to 25 bar. The separation can also be carried out using thermally coupled columns, and these are, for example, operated at a pressure of about 15 or 25 bar. The propene is taken off at the top of the $C_3$ splitter configured as a column, and the propane is taken off at the bottom.

The propene which has been separated off at the top of the $C_3$ splitter can then be recirculated to the epoxidation process as starting material for reaction with the hydroperoxide. The propane can be used for any conceivable purpose, e.g. as energy source for steam generation.

According to a further preferred embodiment of the present invention, the olefin is separated from the absorbent using a separation column. According to a still further embodiment, the absorbent obtained is subsequently purified. If, e.g., the stream introduced in (iii) comprises absorbent, olefin, and alkane, such as, preferably, a hydrocarbon or a mixture of hydrocarbons, propene and propane, the present invention provides a process in which in step (iii) the olefin is separated from absorbent and alkane, the absorbent being subsequently separated from the alkane. According to a preferred embodiment, the absorbent is at least partially recirculated into (ii). According to a further preferred embodiment, the olefin is at least partially recirculated into an epoxidation reaction, preferably an epoxidation reaction the gas stream introduced in (i) results from.

Thus, according to a preferred embodiment of the present invention, the absorbent stream laden with olefin and alkane is passed to a distillation column where the olefin is separated from absorbent, and where the olefin is obtained overhead and the alkane and absorbent are obtained at the bottom.

The distillation column, having preferably of from 80 to 200, more preferably of from 100 to 160 and still more preferably of from 120 to 140 theoretical plates, is operated at a preferred pressure of from 10 to 30 bar, more preferably of from 12 to 28 bar and especially preferably of from 16 to 25 bar.

At the top of this column, an olefin stream, preferably a propene is obtained having a purity of 90% or more, more preferably of 95% or more, and especially preferably of 97% or more.

The olefin, preferably the propene which has been separated off at the top of the column may be at least partially recirculated to the epoxidation process as starting material for reaction with the hydroperoxide.

The bottoms stream obtained from the distillation column essentially consisting of absorbent, preferably the hydrocarbon or hydrocarbons and preferably an alkane, preferably propane, is preferably further worked-up to separate the absorbent from other compounds.

According to a preferred embodiment, this bottom stream is preferably flashed in a flash drum at a pressure of from 0.5 to 4 bar, preferably of from 1 to 1.5 bar, giving a liquid stream with preferably 0.5% or less, more preferably 0.3 wt.-% or less of propene and propane. This liquid stream is preferably recirculated as above-described externally recirculated absorbent to (ii), especially preferably into the absorption column, and in particular into a section of the absorption column upwards the section where the internally recirculated absorbent is introduced. Prior to recirculation, the stream is preferably suitably cooled.

The gaseous phase obtained from the flash drum essentially consists of the light boiling compounds such as olefin and preferably corresponding alkane such as propene and propane, and comprises 6% or less, more preferably 5% or less of absorbent.

This gaseous phase is passed to a heat exchanger where it is cooled to a preferred temperature of from 20 to 60° C., more preferably from 30 to 50° C. and still more preferably from 35 to 45° C. The liquid phase obtained from the heat exchanger is preferably recirculated into the flash drum. The gaseous phase obtained from the heat exchanger contains 50 ppm or less, more preferably 40 ppm or less, more preferably 30 ppm or less, more preferably 20 ppm or less and still more preferably 10 ppm or less of absorbent. This gaseous phase can be used for any conceivable purpose, e.g. as energy source for steam generation.

It might be possible that the bottoms stream obtained from the distillation column where the olefin is separated from the absorbent additionally comprises an alcohol, most preferably methanol, e.g. in concentrations in the range of up to 15 wt.-%, preferably from 1 to 15 wt.-%, more preferably from 5 to 10 wt.-%, based on the total weight of the bottoms stream. This is the case if, for example, the gas stream introduced in (i) results from a reaction, preferably an epoxidation reaction where this alcohol, preferably methanol, is used as solvent. In this case, the absorbent is separated from the alcohol and for example propene and propane in said flash drum or said forced circulation vaporizer so that the absorbent obtained and preferably externally recirculated to (ii) has an alcohol content, preferably a methanol content, of 5 wt.-% or less, preferably 3.5 wt.-% or less, based on the total weight of the absorbent obtained.

According to a still further preferred embodiment, the liquid stream obtained from this step is passed to a heat exchanger prior to external recirculation as absorbent in (ii). In said heat exchanger, the liquid phase, if necessary, may be cooled to a temperature of from 20 to 55° C., preferably of from 25 to 50° C. and especially preferably of from 30 to 45° C.

This heat exchanger used for cooling the liquid stream may have essentially any configuration. Examples of configurations of the heat exchanger are shell-and-tube heat exchangers, coil heat exchangers or plate heat exchangers. For the purposes of the present invention, preference is given to using a heat exchanger which is configured as a shell-and-tube heat exchanger. As coolant, any conceivable medium can be employed. Preferred coolants are, among others, common river water or secondary coolants such as secondary cooling water.

In the overall process of the present invention, the absorption and desorption units are connected to form a continuously operating unit. Moreover, it is preferred that absorption and desorption and olefin, preferably propene separation units are connected to form a continuously operating unit. Moreover, it is preferred that absorption and desorption and olefin, preferably propene separation units are connected with the epoxidation apparatuses to form a continuously operating unit. According to a still further preferred embodiment, the condensates obtained from (i) are recirculated into the epoxidation reaction the gas stream introduced in (i) results from, the olefin obtained in (iii) is recirculated into said epoxidation reaction, and the absorbent obtained from (iii) is recirculated into (ii). According to an especially preferred embodiment of the present invention, the condensates obtained from (i) are recirculated into the epoxidation reaction the gas stream introduced in (i) results from, the bottoms stream obtained from the absorption column in (ii) is internally partially recirculated into (ii), the olefin obtained in (iii) is recirculated into said epxoidation reaction, and the absorbent obtained from (iii) is externally recirculated into (ii).

Therefore, the present invention also provides a continuous, highly integrated process for producing propene oxide, said process comprising reacting propene with hydrogen peroxide in the presence of a titanium zeolite catalyst and methanol as solvent to give a product stream, said product stream comprising propene, propene oxide, methanol, and water, said process further comprising separating propene oxide from said product stream to give the offgas stream, comprising propene, methanol, at least one inert gas, 10 wt.-% oxygen or less, and water, said integrated method further comprising (i) compressing the offgas stream at a pressure of from 13 to 18 bar and cooling the compressed offgas stream at a temperature of from 30 to 45° C. and repeating compressing and cooling once or twice, wherein from 50 to 90 percent by weight of the propene, from 60 to 99 percent by weight of the methanol and/or from 70 to 99.5 percent by weight of the water, comprised in the offgas stream, are condensed and recirculated into said epoxidation reaction;
(ii) separating the propene from the compressed and cooled offgas stream by absorbing the propene at a pressure of from 13 to 18 bar in an absorbent, said absorbent having a boiling point of from 200 to 300° C. at standard pressure and being a mixture of hydrocarbons $C_nH_{2n+2}$ wherein n is from 13 to 15, said mixture comprising the hydrocarbon $C_{14}H_{30}$ in an amount of 30 percent by weight or more of the mixture;
(iii) separating the propene from the absorbent by desorption in a separation column at a pressure of from 16 to 25 bar and a temperature of from 50 to 200° C., recirculating the propene obtained in (iii) into said epoxidation reaction and recirculating the absorbent into (ii).

More preferably, the present invention provides a process for producing an olefin oxide, preferably propene oxide, as described above, additionally comprising
(iv) recirculating the propene stream obtained in (iii) into said epoxidation reaction.

More preferably, the present invention provides a process for producing an olefin oxide, preferably propene oxide, as described above, additionally comprising
(v) partially recirculating the bottoms stream obtained from an absorption column used in (ii), into said absorption column, more preferably into a section of said absorption column upwards the section the compressed and cooled offgas stream obtained in (i) is introduced, and downwards the section the absorbent obtained in (iii) is recirculated.

Still more preferably, the present invention provides a process for producing an olefin oxide, preferably propene oxide, as described above, additionally comprising (iv) and (v).

It is also possible to carry one, two or more steps of the inventive process in batch mode, the continuous mode being preferred.

The following examples are used to illustrate the present invention and are not meant to be limiting.

EXAMPLES

Figure 1:
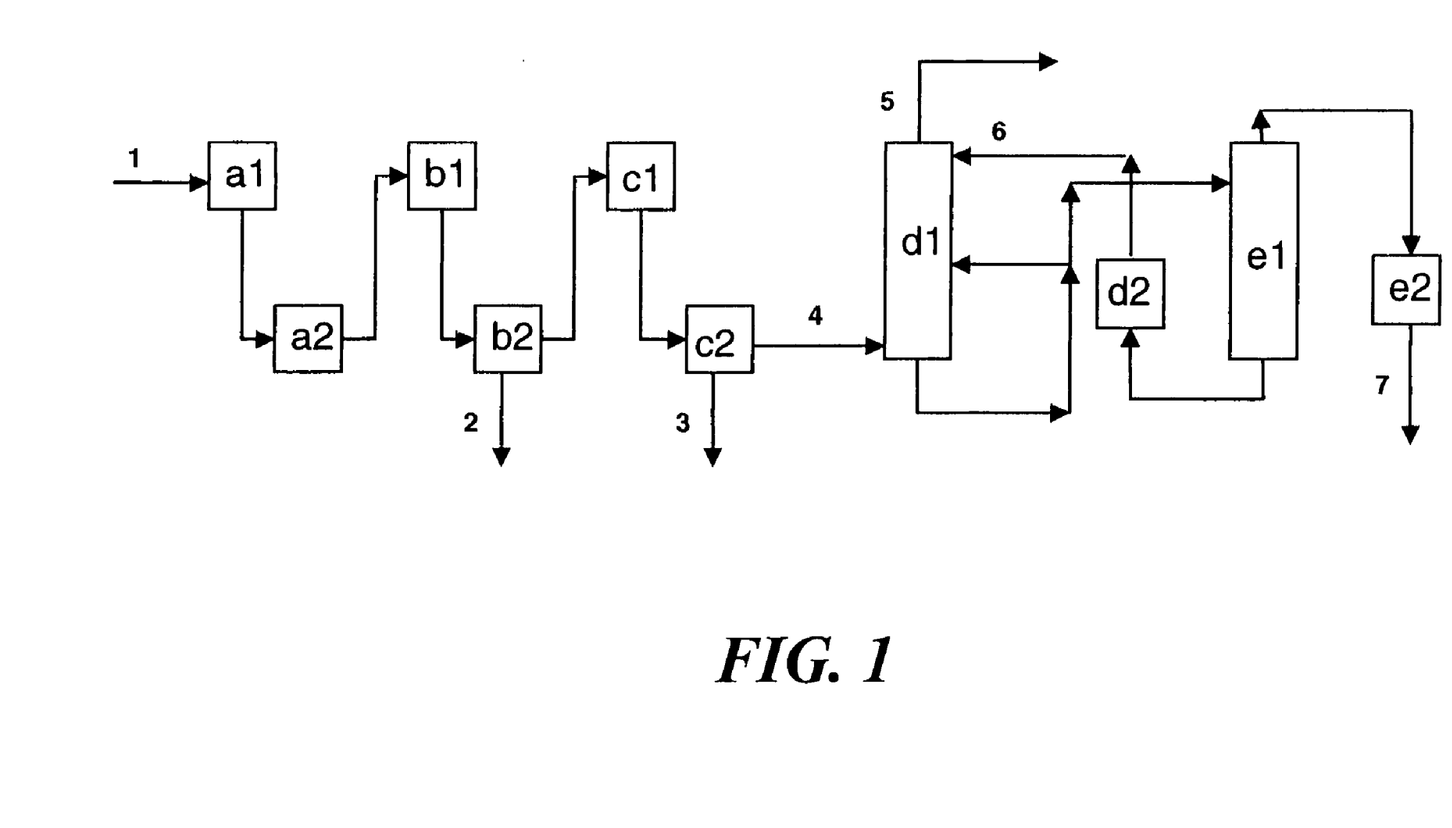
FIG. 1 depicts an example for carrying out the method according to the present invention.

In FIG. 1, a method according to the present invention is depicted where three compressing steps are combined with three cooling steps, and where tetradecane is used as absorbent.

An offgas stream 1 having a temperature of 9° C. is introduced at a pressure of 1.1 bar within a mass flow of 1,000 kg/h in first compressing unit a1. The offgas stream has the following composition: $N_2$ (0.22 wt.-%), $O_2$ (1.06 wt.-%), propene (90.49 wt.-%), propane (4.54 wt.-%), methanol (3.51 wt.-%), water (0.18 wt.-%).

From the first compressing unit, the compressed stream is passed to a first cooling unit a2, the cooled stream is passed to a second compressing unit b1, and the compressed stream leaving b1 is passed to a second cooling unit b2.

From b2, a condensed stream 2 is withdrawn having a temperature of 38° C. at a pressure of 6.6 bar and a mass flow of 2.66 kg/h. The stream 2 has the following composition: $N_2$ (0.00 wt.-%), $O_2$ (0.04 wt.-%), propene (6.96 wt.-%), propane (0.25 wt.-%), methanol (80.70 wt.-%), water (11.63 wt.-%).

The stream passed to a third compressing unit c1 and subsequently passed to a cooling unit c2 is separated in a stream 3 and a stream 4. The condensed stream 3 is withdrawn from c2 having a temperature of 40° C. at a pressure of 16.2 bar and a mass flow of 693.13 kg/h. The stream 3 has the following composition: $N_2$ (0.02 wt.-%), $O_2$ (0.17 wt.-%), propene (90.53 wt.-%), propane (4.53 wt.-%), methanol (4.52 wt.-%), water (0.19 wt.-%).

Stream 4 is withdrawn from cooling unit c2 having a temperature of 40° C. at a pressure of 16.2 bar and a mass flow of 304.04 kg/h. The stream 4 has the following composition: $N_2$ (0.66 wt.-%), $O_2$ (3.08 wt.-%), propene (91.10 wt.-%), propane (4.59 wt.-%), methanol (0.51 wt.-%), water (0.05 wt.-%).

Stream 4 is subsequently introduced into an absorption unit d1 into which part of the bottoms stream as internal absorbent recirculation stream and a stream 6 as external absorbant recirculation stream are additionally introduced. The internal recirculation stream is introduced in d1 upwards the section of d1 the stream 4 is introduced, and the external recirculation stream 6 is introduced in d1 upwards the section of d1 the stream internal recirculation stream is introduced. The pressure in d1 is about 16 bar.

From d1, a top stream 5 is withdrawn having a temperature of 16° C. at a pressure of 16 bar and a mass flow of 1.0.36 kg/h. Stream 5 has the following composition: $N_2$ (18.25 wt.-%), $O_2$ (78.44 wt.-%), propene (1.91 wt.-%), propane (1.33 wt.-%), methanol (0.01 wt.-%), water (0.01 wt.-%), and tetradecane (0.00 wt.-%). The bottoms stream withdrawn from d1 is partially recirculated, as described above, and partially passed into a first desorption unit e1 from which a first stream is withdrawn, passed to a second absorption unit d2 and recirculated as stream 6, as described above, into d1. The stream 6 introduced into d1 has a temperature of 16° C., a pressure of 18 bar and a mass flow of 412.98 kg/h. Stream 6 has the following composition: $N_2$ (0.00 wt.-%), $O_2$ (0.00 wt.-%), propene (0.26 wt.-%), propane (0.20 wt.-%), methanol (0.07 wt.-%), water (0.02 wt.-%), and tetradecane (99.46 wt.-%).

The second stream removed from e1 is passed to a second desorption unit e2 from which a stream 7 results having a temperature of 40° C., a pressure of 18 bar and a mass flow of 293.66 kg/h. Stream 7 has the following composition: $N_2$ (0.05 wt.-%), $O_2$ (0.42), propene (94.2 wt.-%), propane (4.71 wt.-%), methanol (0.53 wt.-%), water (0.05 wt.-%), and tetradecane (0.00 wt.-%).

The absorbent: offgas ratio (mass flow of stream 6: mass flow of stream 1) is 0.42:1.

Figure 2:
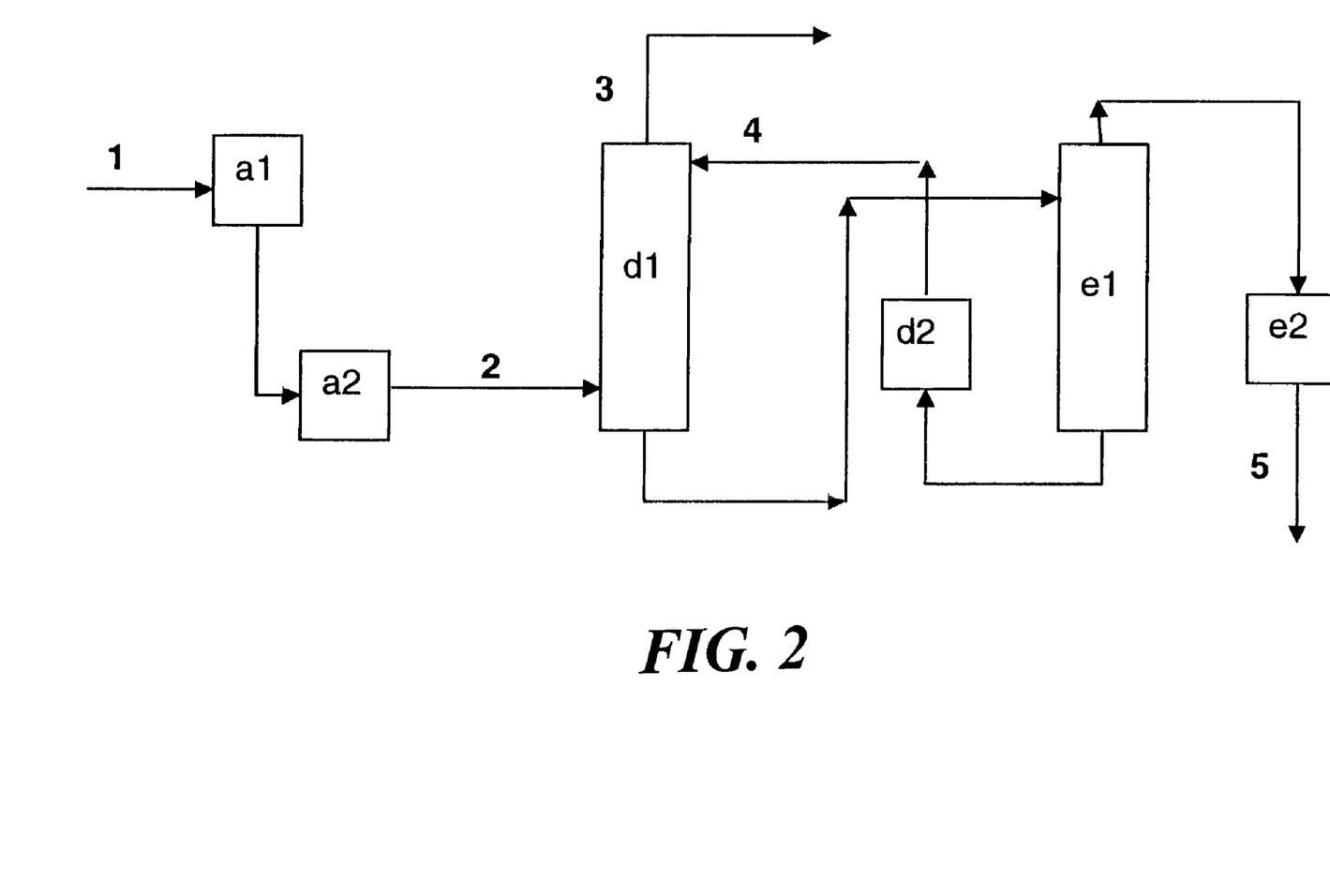
FIG. 2 depicts a comparative example where only one compressing and only one condensing step is carried out.

In FIG. 2, a method according to the prior art is depicted where only one compressing and only one cooling step is employed, and wherein methanol is used as absorbent.

An offgas stream 1 having a temperature of 10° C. is introduced at a pressure of 1.1 bar within a mass flow of 1,000 kg/h in compressing unit a1. The offgas stream has the following composition: $N_2$ (0.22 wt.-%), $O_2$ (1.06 wt.-%), propene (90.49 wt.-%), propane (4.54 wt.-%), methanol (3.51 wt.-%), water (0.18 wt.-%).

From the compressing unit a1, the compressed stream is passed to a cooling unit a2 from which a stream 2 is withdrawn having a temperature of 25° C., a pressure of 2.5 bar and a mass flow of 1,000 kg/h. The stream 2 has the following composition: $N_2$ (0.22 wt.-%), $O_2$ (1.06 wt.-%), propene (90.49 wt.-%), propane (4.54 wt.-%), methanol (3.51 wt.-%), water (0.18 wt.-%).

Stream 2 is subsequently introduced into an absorption unit d1 into which a stream 4 as absorbant recirculation stream is additionally introduced. The recirculation stream is introduced in d1 upwards the section of d1 the stream 2 is introduced. The pressure in d1 is about 2.4 bar.

From d1, a top stream 3 is withdrawn having a temperature of 27° C. at a pressure of 2.4 bar and a mass flow of 21 kg/h. Stream 3 has the following composition: $N_2$ (10.33 wt.-%), $O_2$ (49.30 wt.-%), propene (32.59 wt.-%), propane (0.55 wt.-%), methanol (7.22 wt.-%), water (0.01 wt.-%). The bottoms stream withdrawn from d1 is passed into a first desorption unit e1 from which a first stream is withdrawn, passed to a second absorption unit d2 and recirculated as stream 4, as described above, into d1. The stream 4 introduced into d1 has a temperature of 25° C., a pressure of 2.4 bar and a mass flow of 23,105 kg/h (i.e., about 56 times the value of the respective mass flow according to the invention!). Stream 4 has the following composition: $N_2$ (0.00 wt.-%), $O_2$ (0.00 wt.-%), propene (0.01 wt.-%), propane (0.00 wt.-%), methanol (99.98 wt.-%), water (0.01 wt.-%).

The second stream removed from e1 is passed to a second desorption unit e2 from which a stream 5 results having a temperature of 18° C., a pressure of 18 bar and a mass flow of 963 kg/h. Stream 5 has the following composition: $N_2$ (0.01 wt.-%), $O_2$ (0.03), propene (93.26 wt.-%), propane (4.68 wt.-%), methanol (2.00 wt.-%), water (0.01 wt.-%).

The absorbent:offgas ratio (mass flow of stream 4:mass flow of stream 1) is 23:1 (i.e.).

Thus, contrary to the method according to the invention, a method according to which a similar amount of oxygen is removed from d1 per hour can be carried out only at an absorbent recirculation stream (stream 4) at a much higher mass flow than the respective recirculation stream according to the invention (stream 6). However, the higher the mass flow, the larger the dimensions which are necessary for treating this stream, for example the desorption unit e1 and the absorption unit d2. From this aspect alone the method of the present invention shows its superiority compared to the described method of the prior art. Moreover, stream 5 withdrawn from e2 according to the method of the prior art contains a significant amount of absorbent (methanol; 2.00 wt.-%) whereas in the respective stream 7 of the present invention, the absorbent content is 0.00 wt.-%.

We claim:

1. A method of separating an olefin from a gas stream, wherein the gas stream is an offgas stream resulting from an epoxidation process, said process comprising reacting an olefin with a hydroperoxide to give a product stream comprising olefin, olefin oxide, and solvent, and separating the olefin oxide from said product stream by distillation, wherein at least one inert gas is introduced, to give the offgas stream comprising the olefin, solvent, the at least one inert gas, and 10 wt. % of oxygen or less, said method comprising
   (i) compressing and cooling the gas stream;
   (ii) separating the olefin from the gas stream by absorbing the olefin in an absorbent in an absorption unit, wherein no inert gas is additionally added to the absorption unit; and
   (iii) separating the olefin from the absorbent by desorption;
   wherein compressing or cooling or compressing and cooling in (i) is carried out at least twice.

2. The method as claimed in claim 1, wherein compressing and cooling in (i) is carried out three times.

3. The method as claimed in claim 1, wherein, in (i), the gas stream is compressed to a pressure of from 10 to 20 bar and cooled to a temperature of from 25 to 50° C.

4. The method as claimed in claim 1, wherein, in (i), from 30 to 90 percent of the olefin comprised in the gas stream are condensed.

5. The method as claimed in claim 1, wherein the gas stream additionally comprises methanol or water or methanol and water.

6. The method as claimed in claim 5, wherein, in (i), from 30 to 90 percent by weight of the olefin, from 40 to 99 percent by weight of the methanol and/or from 35 to 99 percent by weight of the water, comprised in the gas stream, are condensed.

7. The method as claimed in claim 1, wherein the absorbent has a boiling point of from 200 to 300° C. at standard pressure.

8. The method as claimed in claim 1, wherein rating the olefin from the absorbent is carried out in at least one separation column.

9. The method as claimed in claim 8, wherein, after separation of the olefin in (iii), the absorbent is recirculated into (ii).

10. The method as claimed in claim 8, wherein, after separation of the olefin, the absorbent is purified in a flash drum or in a forced circulation vaporizer and subsequently recirculated into (ii).

11. The method as claimed in claim 1, wherein the olefin is propene.

12. The method as claimed in claim 1, wherein the epoxidation reaction is carried out in the presence of a solvent comprising methanol.

13. The method as claimed in claim 1, wherein the epoxidation reaction is carried out in the presence of a titanium zeolite catalyst.

14. The method as claimed in claim 1, wherein the offgas stream comprises the olefin, methanol, water, at least one inert gas, 10 wt.-% of oxygen or less, and 100 ppm olefin oxide or less.

15. The method as claimed in claim 14, wherein, in (i), from 30 to 90 percent by weight of the olefin, from 40 to 99 percent by weight of the methanol and from 35 to 99 percent by weight of the water, comprised in the offgas stream, are condensed.

16. The method as claimed in claim 1, wherein the olefin is propene and the olefin oxide is propene oxide.

17. The method as claimed in claim 1, wherein the olefin obtained in (iii) is recirculated into said epoxidation reaction.

18. The method as claimed in claim 15, wherein the olefin, the methanol, and the water condensed in (i) are recirculated into said epoxidation reaction.

19. The method as claimed in claim 18, wherein the olefin is propene.

20. A method of separating propene from a gas stream, wherein the gas stream is an offgas stream resulting from an epoxidation process, said process comprising reacting a propene with a hydroperoxide to give a product stream comprising propene, propene oxide, and solvent, and separating the propene oxide from said product stream by distillation, wherein at least one inert gas is introduced, to give the offgas stream comprising the propene, solvent, the at least one inert gas, and 10 wt. % of oxygen or less, said method comprising
(i) compressing and cooling the gas stream;
(ii) separating the propene from the gas stream by absorbing the propene in an absorbent in an absorption unit, wherein no inert gas is additionally added to the absorption unit; and
(iii) separating the propene from the absorbent by desorption;
wherein compressing or cooling or compressing and cooling in (i) is carried out twice or three times.

21. The method as claimed in claim 20, wherein the gas stream is the offgas stream resulting from an epoxidation process, said process comprising reacting the propene with hydrogen peroxide in the presence of methanol as solvent and a titanium zeolite catalyst to give a product stream comprising propene, propene oxide, methanol, and water, and separating the propene oxide from said product stream to give the offgas stream comprising propene, methanol, and water.

22. The method as claimed in claim 21, wherein, in (i), the offgas stream is compressed to a pressure of from 13 to 18 bar and cooled to a temperature of from 30 to 45° C. and from 40 to 85 percent by weight of the propene, from 60 to 99 percent by weight of the methanol and/or from 40 to 95 percent by weight of the water, comprised in the offgas stream, are condensed.

23. The method as claimed in claim 22, wherein the propene, the methanol, and the water condensed in (i) are recirculated into said epoxidation reaction.

24. The method as claimed in claim 20, wherein absorbing the propene in an absorbent is carried out in at least one absorption column at a pressure of from 13 to 18 bar and a temperature of from 30 to 45° C., said absorbent having a boiling point of from 200 to 300° C. at standard pressure, and wherein separating the propene from the absorbent is carried in at least one separation column at a pressure of from 10 to 30 bar and a temperature of from 50 to 200° C.

25. The method as claimed in claim 20, wherein the propene obtained in (iii) is recirculated into said epoxidation reaction.

26. The method as claimed in claim 20, wherein, after separation of propene in (iii), the absorbent is recirculated into (ii).

27. The method as claimed in claim 20, wherein, after separation of propene in (iii), the absorbent, additionally comprising propane and methanol, is separated from propane and methanol and subsequently recirculated into (ii).

28. The method as claimed in claim 27, wherein the separation of absorbent from propene and methanol is carried out in a flash drum or in a forced circulation vaporizer.

29. A method of separating an olefin from a gas stream, wherein the gas stream is an offgas stream resulting from an epoxidation process, said process comprising reacting an olefin with a hydroperoxide to give a product stream comprising olefin, olefin oxide, and solvent, and separating the olefin oxide from said product stream by distillation, wherein at least one inert gas is introduced, to give the offgas stream comprising the olefin, solvent, the at least one inert gas, and 10 wt. % of oxygen or less, said method comprising
(i) compressing and cooling the gas stream;
(ii) separating the olefin from the gas stream by absorbing the olefin in an absorbent in an absorption unit, said absorbent having a boiling point of from 200 to 300° C. at standard pressure and being a mixture of hydrocarbons $C_nH_{2n+2}$ wherein n is from 10 to 20, said mixture comprising the hydrocarbon $C_{14}H_{30}$ in an amount of 30 percent by weight of the mixture or more, wherein no inert gas is additionally added to the absorption unit; and
(iii) separating the olefin from the absorbent by desorption;
wherein compressing or cooling or compressing and cooling in (i) is carried out twice or three times.

30. The method as claimed in claim 29, wherein the absorbent is a mixture of hydrocarbons $C_nH_{2n+2}$ wherein n is from 13 to 15, said mixture comprising the hydrocarbon $C_{14}H_{30}$ in an amount of 50 percent by weight of the mixture or more.

31. The method as claimed in claim 29, wherein the olefin obtained in (iii) is recirculated into said epoxidation reaction.

32. The method as claimed in claim 29, wherein, after separation of the olefin in (iii), the absorbent is purified in a flash drum or in a forced circulation vaporizer and, after purification, recirculated into (ii).

33. The method as claimed in claim 29, wherein the gas stream is the offgas stream resulting from an epoxidation process, said process comprising reacting the olefin with a hydroperoxide in the presence of methanol as solvent to give a product stream, and separating the olefin oxide from said product stream to give the offgas stream, said offgas stream comprising the olefin, methanol, water, at least one inert gas, 7 wt.-% of oxygen or less, and 100 ppm olefin oxide or less.

34. The method as claimed in claim 33, wherein, in (i), the offgas stream is compressed to a pressure of from more than 10 to 20 bar and cooled to a temperature of from 25 to 50° C. and from 40 to 85 percent by weight of the olefin, from 60 to 99 percent by weight of the methanol and from 40 to 95 percent by weight of the water, comprised in the offgas stream, are condensed.

35. The method as claimed in claim 34, wherein the olefin, the methanol, and the water condensed in (i) are recirculated into said epoxidation reaction.

36. The method as claimed in claim 29, wherein absorbing the olefin in the absorbent is carried out in at least one absorption column at a pressure of from more than 10 to 20 bar, and wherein separating the olefin from the absorbent is carried in at least one separation column at a pressure of from 12 to 28 bar and a temperature of from 50 to 200° C.

37. The method as claimed in claim 31, wherein the olefin obtained in (iii) is obtained by separation from absorbent in a separation column.

38. The method as claimed in claim 29, wherein the olefin is propene and the hydroperoxide is hydrogen peroxide.

39. A method of separating propene from a gas stream, said gas stream being an offgas stream of an epoxidation process, said epoxidation process comprising reacting propene with hydrogen peroxide in the presence of a titanium zeolite catalyst and methanol as solvent to give a product stream, said epoxidation process further comprising separating propene oxide from said product stream to give said offgas stream, said offgas stream comprising propene, methanol, and water, said method comprising
 (i) compressing the offgas stream at a pressure of from 13 to 18 bar and cooling the compressed offgas stream at a temperature of from 30 to 45° C. and repeating compressing and cooling once or twice, wherein from 50 to 80 percent by weight of the propene, from 60 to 99 percent by weight of the methanol and/or from 45 to 90 percent by weight of the water, comprised in the offgas stream, are condensed and recirculated into said epoxidation reaction;
 (ii) separating the propene from the compressed and cooled offgas stream by absorbing the propene at a pressure of from 13 to 18 bar in an absorbent, said absorbent having a boiling point of from 200 to 300° C. at standard pressure and being a mixture of hydrocarbons $C_nH_{2n+2}$ wherein n is from 13 to 15, said mixture comprising the hydrocarbon $C_{14}H_{30}$ in an amount of 30 percent by weight of the mixture or more;
 (iii) separating the propene from the absorbent by desorption in a separation column at a pressure of from 12 to 28 bar and a temperature of from 50 to 200° C., and recirculating the absorbent into (ii); and
 (iv) recirculating the propene stream obtained in (iii) into said epoxidation reaction.

40. An integrated process for producing propene oxide, said process comprising reacting propene with hydrogen peroxide in the presence of a titanium zeolite catalyst and methanol as solvent to give a product stream, said product stream comprising propene, propene oxide, methanol, and water, said process further comprising separating propene oxide from said product stream to give the offgas stream, comprising propene, methanol, at least one inert gas, 7 wt. % oxygen or less, and water, said integrated process further comprising
 (i) compressing the offgas stream at a pressure of from 13 to 18 bar and cooling the compressed offgas stream at a temperature of from 30 to 45° C. and repeating compressing and cooling once or twice, wherein from 50 to 80 percent by weight of the propene, from 60 to 99 percent by weight of the methanol and/or from 45 to 90 percent by weight of the water, comprised in the offgas stream, are condensed and recirculated into an epoxidation reaction;
 (ii) separating the propene from the compressed and cooled offgas stream by absorbing the propene at a pressure of from 13 to 18 bar in an absorbent, said absorbent having a boiling point of from 200 to 300° C. at standard pressure and being a mixture of hydrocarbons $C_nH_{2n+2}$ wherein n is from 13 to 15, said mixture comprising the hydrocarbon $C_{14}H_{30}$ in an amount of 30 percent by weight of the mixture or more; and
 (iii) separating the propene from the absorbent in a separation column at a pressure of from 16 to 25 bar and a temperature of from 50 to 200° C., recirculating the propene obtained in (iii) into said epoxidation reaction, purifying the absorbent obtained in a forced circulation vaporizer at a pressure of from 0.5 to 4 bar and recirculating the purified absorbent into (ii).

41. An integrated process for producing propene oxide, said process comprising reacting propene with hydrogen peroxide in the presence of a titanium zeolite catalyst and methanol as solvent to give a product stream, said product stream comprising propene, propene oxide, methanol, and water, said process further comprising separating propene oxide from said product stream to give the offgas stream, comprising propene, methanol, at least one inert gas, 7 wt. % oxygen or less, and water, said integrated process further comprising
 (i) compressing the offgas stream at a pressure of from 13 to 18 bar and cooling the compressed offgas stream at a temperature of from 30 to 45° C. and repeating compressing and cooling once or twice, wherein from 50 to 80 percent by weight of the propene, from 60 to 99 percent by weight of the methanol and/or from 45 to 90 percent by weight of the water, comprised in the offgas stream, are condensed and recirculated into an epoxidation reaction;
 (ii) separating the propene from the compressed and cooled offgas stream by absorbing the propene at a pressure of from 13 to 18 bar in an absorbent, said absorbent having a boiling point of from 200 to 300° C. at standard pressure and being a mixture of hydrocarbons $C_nH_{2n+2}$ wherein n is from 13 to 15, said mixture comprising the hydrocarbon $C_{14}H_{30}$ in an amount of 30 percent by weight of the mixture or more;
 (iii) separating the propene from the absorbent in a separation column at a pressure of from 16 to 25 bar and a temperature of from 50 to 200° C., recirculating the propene obtained in (iii) into said epoxidation reaction, purifying the absorbent obtained in a forced circulation vaporizer at a pressure of from 0.5 to 4 bar and recirculating the purified absorbent into (ii);
 (iv) recirculating the propene stream obtained in (iii) into said epoxidation reaction; and
 (v) partially recirculating the bottoms stream obtained from an absorption column used in (ii), into said absorption column.

42. The method as claimed in claim 1, wherein absorbing the olefin in an absorbent is carried out in at least one absorption column at a pressure of from more than 10 to 20 bar.

43. The method as claimed in claim 1, wherein the absorbent is a mixture of hydrocarbons $C_nH_{2n+2}$ wherein n is from 10 to 20, said mixture comprising the hydrocarbon $C_{14}H_{30}$ in an amount of 10 percent by weight or more of the mixture.

44. The method as claimed in claim 24, wherein the absorbent is a mixture of hydrocarbons $C_nH_{2n+2}$ wherein n is from 10 to 20, said mixture comprising the hydrocarbon $C_{14}H_{30}$ in an amount of 10 percent by weight of the mixture or more.

* * * * *